Patented Sept. 22, 1942

2,296,823

UNITED STATES PATENT OFFICE 2,296,823

PREPARATION OF UNSATURATED ALCOHOL ESTERS

Maxwell A. Pollack, Akron, and Albert G. Chenicek, Barberton, Ohio, assignors to Pittsburgh Plate Glass Company, Allegheny County, Pa., a corporation of Pennsylvania No Drawing. Application January 27, 1940,
Serial No. 315,970

5 Claims. (Cl. 260—485)

This invention relates to a method of preparing unsaturated alcohol esters of organic acids, particularly weak organic acids and is particularly directed to the preparation of methallyl esters. Prior to the present invention, attempts have been made to prepare methallyl type esters by direct esterification with acids or by an ester interchange method. Neither method appears to result in efficient yields. In part, these low yields are due to the fact that a large portion of the methallyl alcohol used in the reaction is lost through rearrangement to form aldehydes and other products.

In accordance with our invention, we have found that unsaturated alcohol esters may be prepared in substantially higher yield by permitting an unsaturated halide to react with a salt of an organic acid. The invention is particularly applicable to preparation of esters of methallyl type alcohols which contain at least 4 carbon atoms and a carbinol group linked to an unsaturated tertiary atom by treatment of methallyl type halides having the characteristic grouping

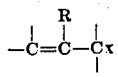

where R is an organic radicle such as methyl, ethyl, phenyl, allyl, chloro methyl, chloro ethyl, etc., and $x$ is a halogen such as chlorine, bromine, fluorine, or iodine, such as methallyl chloride, ethyl allyl chloride, propyl allyl chloride, methyl methalyl chloride, mono-, di- or trichloro methyl allyl chloride, mono-, di- or tri-chloro methyl allyl chloride, or other halogen substituted methallyl type halide or similar methallyl type halides. In such cases, esters may be formed without the objectionable molecular rearrangement which normally occurs in usual esterification processes. In addition, the invention may be applied to the production of other unsaturated esters by treatment of other unsaturated halides which contain a halogen attached to a saturated carbon atom such as an allyl type or other halide, for example, allyl, crotyl, oleyl, linoleyl, fenchyl, cinnamyl, propargyl, 2-chloroallyl chlorides, bromides, iodides, etc. may be treated in accordance with the present invention. Similarly, mixtures of methallyl type halides with vinyl type halides such as may result from the chlorination by allylic substitution of isobutylenes or other olefin may be treated to form methallyl type esters.

The reaction is preferably conducted in an aqueous medium and in most cases it is found desirable to conduct the reaction in the presence of a suitable agent capable of reducing the surface tension of the aqueous medium, such as sodium oleate, trisodium phosphate, alcohols such as methyl or ethyl alcohol, sulphuric esters or primarily aliphatic alcohols such as hexyl, lauryl, or octyl sulphate, aryl or aralkyl sulphonates, or sulphonic acids such as isopropyl naphthalene sulphonic acid, phenol sulphonic acids, benzene sulphonic acid or the sodium salts thereof, sulphonate or sulphated petroleum or vegetable oil, Turkey red oil, alkylol amines such as triethanol amine or monoethanol amine, sodium silicate, colloidal silicic acid, etc. The amount of surface tension reducing agent required is capable of some variation but in most cases should not be present in large quantities. Generally, sufficient agent is used to reduce the surface tension of the aqueous medium below about 50 to 60 dynes per centimeter. 0.1 to 0.5 percent has been found suitable for most purposes. In general, excess concentrations of wetting agents such as alcohol are undesirable since the alcohol increases the solubility of the ester in the aqueous medium, thus making recovery of the ester more difficult.

The amount of water present should be sufficient to dissolve all or a substantial portion of the salt or at least to form a thin aqueous slurry of the salt. In general, it is preferred to utilize a solution which is not excessively concentrated. The reaction is preferably assisted by application of heat to maintain the temperature of the reaction mixture at 40 to 250° C. The reaction may be conducted in a closed vessel and pressure may be applied, if desired, but in many cases this is undesirable since polymerization of the allyl chloride and/or the ester may occur, thus complicating the reaction. In accordance with our invention, we have found that it is desirable to avoid the use of pressure. This may be done by introducing vapors of the unsaturated halides into the lower portion of an aqueous solution or dispersion of the salt whereby reaction occurs and the vapors are absorbed. If mixtures containing vinyl type halides are used, these materials will not be decomposed to any appreciable degree and will not be absorbed. If all of the methallyl chloride or other methallyl type or similar halide is not absorbed the vapors may be recycled or retreated in order to complete the separation. The halide vapors may be bubbled through the solution continuously, if desired, and a portion of the solution withdrawn continuously or intermittently. The ester thus formed separates in a layer and generally settles to the bottom of the column where it may be withdrawn. In some cases, however, the ester becomes mixed with methallyl chloride or similar halide and the mixture collects as a layer upon the surface of the aqueous solution.

In treating salts of polycarboxylic acids, either the mono or polyester may be prepared. In some cases, it is desirable to utilize salts of partially esterified salts of esterified acids such as partial alkyl or mono alkenyl esters such as sodium mono allyl maleate, fumarate, oxalate, phthalate, malonate, succinate, tartrate, itaconate, citrate, etc., or the corresponding sodium methallyl or sodium crotyl or sodium methyl, ethyl, propyl phthalate, maleate, etc., or other salt of a partially esterified polycarboxylic acid. Utilization of such agents often results in higher yields of the esters and also permits the preparation of mixed esters such as methallyl allyl esters in a simple manner.

The following examples are illustrative:

*Example I.*—A quantity of methallyl chloride was added dropwise to an aqueous solution containing 20 percent by weight of sodium crotonate and 0.5 percent by weight of isopropyl naphthalene sodium sulphonate at a temperature of 75–90° C. Addition of methallyl chloride was continued until a slight excess of methallyl chloride had been added. Reaction occurred during the addition and methallyl crotonate separated in a layer and was collected. After purification by distillation, the yield of the ester was 85 percent.

*Example II.*—A continuous stream of methallyl chloride vapor was introduced at the base of a column of an aqueous solution containing 15 percent sodium phthalate and 0.2 percent of isopropyl naphthalene sodium sulphonate at a temperature of 80–100° C. The methallyl chloride was absorbed immediately by the solution to form dimethallyl phthalate. The process was operated continuously for many hours and dimethallyl phthalate was collected as a layer and withdrawn intermittently.

*Example III.*—The process of Example II was repeated using a solution containing 20 percent by weight sodium methacrylate, 0–0.3 percent para phenylene diamine and 0.5 percent by weight of isopropyl naphthalene sodium sulphonate at a temperature of 79–88° C., methallyl methacrylate being produced.

*Example IV.*—The process of Example II was repeated using a solution of 20 percent by weight of sodium maleate and 0.5 percent by weight of isopropyl naphthalene sulphonate at a temperature of 75–85° C., dimethallyl maleate being produced.

*Example V.*—The process of Example II was repeated using sodium fumarate whereby dimethallyl fumarate was produced.

*Example VI.*—The process of Example II was repeated using an aqueous solution containing 20 percent by weight of sodium salt of mono ethyl maleate and 0.5 percent of isopropyl naphthalene sodium sulphonate at a temperature of 85–95° C., ethyl methallyl maleate being formed.

Various organic salts have been found to be effective but in general, the alkali metal salts such as the sodium salts are most suitable. Sodium salts of saturated mono or polycarboxylic acids such as salts of mono alkyl or alkenyl partial esters, for example, sodium methyl, ethyl allyl, methallyl, or crotyl oxalate, tartrate, citrate, fumarate, maleate, etc., or other salts such as mono-, di- or poly-sodium oxalate, tartrate, citrate, formate, acetate, succinate, tetrolate, benzoate, valerate, malate, malonate, citraconate, pyruvate, lactate, propionate, dichloro propionate, or phthalate, or of unsaturated acids such as mono- or disodium maleate or fumarate, sodium crotonate, acrylate, α-chloracrylate, itaconate, α-bromacrylate, methacrylate, cinnamate, propiolate, benzoate, or the sodium salts of cyanuric acid and ammeline, ammelide, kojic acid, etc. may be used for this purpose. In addition, the corresponding salts of other alkali metals such as potassium or lithium may be used. In like manner, other metallic salts such as ammonium, calcium, barium, strontium, magnesium, copper, zinc, iron, chromium, silver salts or other salts may be treated. Similarly, salts of inorganic acids such as sodium sulphide, sulphite, thiocyanate, phosphate, nitrite, cyanide, or other salt may be used in accordance with this invention. In general, it is found that the yields obtained from salts of relatively weak acids are substantially greater than those obtained from salts of relatively strong acids. For this reason, it is desirable to use salts of weak organic acids which have determinable dissociation constants, generally below about 0.05 and preferably not in substantial excess of 0.02.

While the invention has been described with particular reference to the production of the esters in an aqueous medium, the invention is not so limited since the esters may be prepared by heating the salt and the unsaturated halide in the substantial absence of water and in the presence or absence of solvents such as alcohol or ether. This process is often advantageous when the ester being formed is hydrolyzed readily as in the case of many oxalic acid esters.

Although the present invention has been described with particular reference to the specific details of certain embodiments thereof, it is not intended that such details shall be regarded as limitations upon the scope of the invention except insofar as included in the accompanying claims.

We claim:

1. A method of preparing a methallyl ester which comprises reacting methallyl chloride with an aqueous solution of a salt of an acid of the group consisting of maleic and fumaric acid.

2. The method of preparing an unsaturated ester which comprises reacting an unsaturated aliphatic halide containing a halogen atom attached to a saturated carbon atom with an aqueous solution of a water soluble salt of a weak organic carboxylic acid in the presence of an agent capable of reducing the surface tension of the solution in amount sufficient to reduce the surface tension below about 60 dynes per centimeter.

3. The process of claim 2 in which the unsaturated halide is a chloride.

4. The method of preparing an unsaturated ester which comprises reacting an unsaturated aliphatic halide containing a halogen atom attached to a saturated carbon atom with an aqueous solution of a sodium salt of a weak organic carboxylic acid in the presence of an agent capable of reducing the surface tension of the solution in amount sufficient to reduce the surface tension below about 60 dynes per centimeter.

5. The process of claim 4 in which the unsaturated halide is methallyl chloride.

MAXWELL A. POLLACK.
ALBERT G. CHENICEK.